(12) United States Patent
Yoda et al.

(10) Patent No.: US 9,994,250 B2
(45) Date of Patent: Jun. 12, 2018

(54) POWER STEERING DEVICE

(71) Applicant: HITACHI AUTOMOTIVE SYSTEMS, LTD., Hitachinaka-shi, Ibaraki (JP)

(72) Inventors: Toshiro Yoda, Higashimatsuyama (JP); Takuya Ishihara, Kumagaya (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days. days.

(21) Appl. No.: 15/126,112

(22) PCT Filed: Jan. 14, 2015

(86) PCT No.: PCT/JP2015/050748
§ 371 (c)(1),
(2) Date: Sep. 14, 2016

(87) PCT Pub. No.: WO2015/141255
PCT Pub. Date: Sep. 24, 2015

(65) Prior Publication Data
US 2017/0096160 A1 Apr. 6, 2017

(30) Foreign Application Priority Data
Mar. 19, 2014 (JP) ................. 2014-055946

(51) Int. Cl.
*B62D 5/04* (2006.01)
*B62D 15/02* (2006.01)
(Continued)

(52) U.S. Cl.
CPC .......... *B62D 5/0403* (2013.01); *B62D 5/046* (2013.01); *B62D 5/0487* (2013.01); *B62D 5/062* (2013.01);
(Continued)

(58) Field of Classification Search
CPC .... B62D 5/0403; B62D 5/046; B62D 5/0487; B62D 5/062; B62D 5/12; B62D 6/00; B62D 15/021
(Continued)

(56) References Cited

U.S. PATENT DOCUMENTS 2,988,059 A * 6/1961 Wysong, Jr. ............. B62D 5/24
137/625.2
3,195,575 A * 7/1965 Sheppard ............... B62D 5/087
137/625.48
(Continued)

FOREIGN PATENT DOCUMENTS

JP 61-119467 A 6/1986
JP 64-41466 A 2/1989
(Continued)

Primary Examiner — Jacob D Knutson
(74) Attorney, Agent, or Firm — Foley & Lardner LLP

(57) ABSTRACT

A steering shaft 10 is constructed by an input shaft 11, an intermediate shaft 13 connected to the input shaft 11 through a first torsion bar 12 and an output shaft 15 connected to the intermediate shaft 13 through a second torsion bar 14, and around the input shaft 11, there is provided a first resolver 51 for detecting a rotation angle of the input shaft 11 and around the intermediate shaft 13, there is provided a second resolver 52 for detecting a rotation angle of the intermediate shaft 13, and the first and second resolvers 51 and 52 are arranged to constitute a torque sensor TS that detects a steering torque.

21 Claims, 6 Drawing Sheets

(51) Int. Cl.
  *B62D 6/00* (2006.01)
  *B62D 5/06* (2006.01)
  *B62D 5/12* (2006.01)

(52) U.S. Cl.
  CPC .............. *B62D 5/12* (2013.01); *B62D 6/00* (2013.01); *B62D 15/021* (2013.01)

(58) Field of Classification Search
  USPC .................. 180/422, 441, 443, 444, 446
  See application file for complete search history.

(56) References Cited

U.S. PATENT DOCUMENTS

| | | | | |
|---|---|---|---|---|
| 3,906,837 A | * | 9/1975 | Sheppard | B62D 5/24 91/378 |
| 5,954,152 A | * | 9/1999 | Kada | B62D 5/065 180/422 |
| 2004/0020708 A1 | * | 2/2004 | Szabela | B62D 5/001 180/446 |
| 2007/0017734 A1 | * | 1/2007 | Sherwin | B62D 6/008 180/446 |
| 2012/0160594 A1 | * | 6/2012 | Yoda | B62D 5/062 180/422 |
| 2012/0261209 A1 | | 10/2012 | Shiino | |
| 2014/0345965 A1 | * | 11/2014 | Ura | B62D 5/0835 180/404 |
| 2015/0298728 A1 | * | 10/2015 | Yoda | H02K 7/06 180/422 |

FOREIGN PATENT DOCUMENTS

| | | |
|---|---|---|
| JP | 2005-096767 A | 4/2005 |
| JP | 2007-181327 A | 7/2007 |
| JP | 2007-253703 A | 10/2007 |
| JP | 2007-253713 A | 10/2007 |
| JP | 2008-184049 A | 8/2008 |
| JP | 2009-154549 A | 7/2009 |
| JP | 2009-298372 A | 12/2009 |
| JP | 2010-286310 A | 12/2010 |
| JP | 2012-225679 A | 11/2012 |
| JP | 2012-237591 A | 12/2012 |

\* cited by examiner

POWER STEERING DEVICE

TECHNICAL FIELD

The present invention relates to an auto-steerable power steering device that carries out a steering assist with the aid of hydraulic pressure supplied/discharged upon opening/closing of a rotary valve based on a steering torque of a driver or a drive torque of a motor.

BACKGROUND ART

As a conventional auto-steerable power steering device, the device disclosed in Patent Document-1 is known.

That is, the known power steering device is of a rack-and-pinion type hydraulic power steering device and generally comprises an input shaft connected to a steering wheel, an output shaft relatively rotatably connected to the input shaft through a torsion bar, a rotary valve arranged between the input and output shafts around a lower end portion of the input shaft and a hollow motor arranged around an upper end portion of the input shaft. An optimal steering assist control is carried out based on a detection result by a torque sensor including a first resolver disposed on an outer surface of the input shaft and a second resolver disposed on an outer surface of the output shaft and output signals produced by a vehicle speed sensor, etc.

PRIOR ART DOCUMENT

Patent Document

Patent Document-1: Japanese Laid-open Patent Application (tokkai) 2005-96767

SUMMARY OF INVENTION

However, in case of the above-mentioned conventional power steering device, a rigidity of the torsion bar appropriate for detecting the steering torque and that of the torsion bar appropriate for opening/closing (controlling) of the rotary valve are different, and thus, hitherto, both a high accuracy opening/closing of the control valve and a high accuracy detection by the torque sensor have not been achieved at the same time.

The present invention is provided by taking the above-mentioned technical drawbacks into consideration and aims to provide a power steering device that is able to achieve both the high accuracy detection of the torque sensor and the high accuracy opening/closing (control) of the rotary valve at the same time.

Means for Solving Problem

According to the present invention, there is provided a power steering device which is characterized by having a steering shaft including an input shaft rotated together with a steering operation of a steering wheel, an intermediate shaft connected to the input shaft through a first torsion bar, and an output shaft connected to the intermediate shaft through a second torsion bar; a housing that rotatably supports the output shaft; a piston slidably received in the housing to part an interior of the housing into first and second pressure chambers; a control valve installed in the housing to selectively feed an operating fluid into the first or second pressure chamber in accordance with a relative rotation between the intermediate shaft and the output shaft, the operating fluid being supplied from an external fluid source; a transmission mechanism through which an axial movement of the piston is transmitted to steered road wheels; a hollow motor including a motor rotor provided on an outer cylindrical surface of the intermediate shaft to make an integral rotation therewith, a motor element including a motor stator arranged about the motor rotor and a motor housing for housing the motor element, the hollow motor controlling the rotation of the input shaft in accordance with an operation condition of an associated motor vehicle; a torque sensor including a first rotation angle sensor for detecting a rotation angle of the input shaft, a second rotation angle sensor for detecting a rotation angle of the intermediate shaft and first and second output wirings for feeding output signals of the first and second rotation angle sensors to an external control device, the torque sensor outputting to the control device a signal used for calculating a steering torque that is produced in the first torsion bar in accordance with a difference between the rotation angle of the input shaft and that of the intermediate shaft; and a motor wiring connected to the motor stator and receiving an output signal from the control device, the output signal being calculated based on the steering torque and various information of the vehicle.

Effects of the Invention

In accordance with the present invention, the first torsion bar that affects detection of the steering torque and the second torsion bar that affects opening/closing of the rotary valve are separately provided, and thus, it is possible to set the stiffness (spring constant) of each of the two torsion bars to a value suitable to the torque sensor or the rotary valve, and thus, a high accuracy detection by the torque sensor and a high accuracy opening/closing (control) of the rotary valve are achieved at the same time.

EMBODIMENT OF THE INVENTION

In the following, a power steering device that is an embodiment of the present invention will be described with reference to the accompanying drawings. In the following, the description is directed to an example in which the power steering device of the embodiment is applied to an integral type power steering device that is widely employed in large vehicles and the like.

Figure 1:
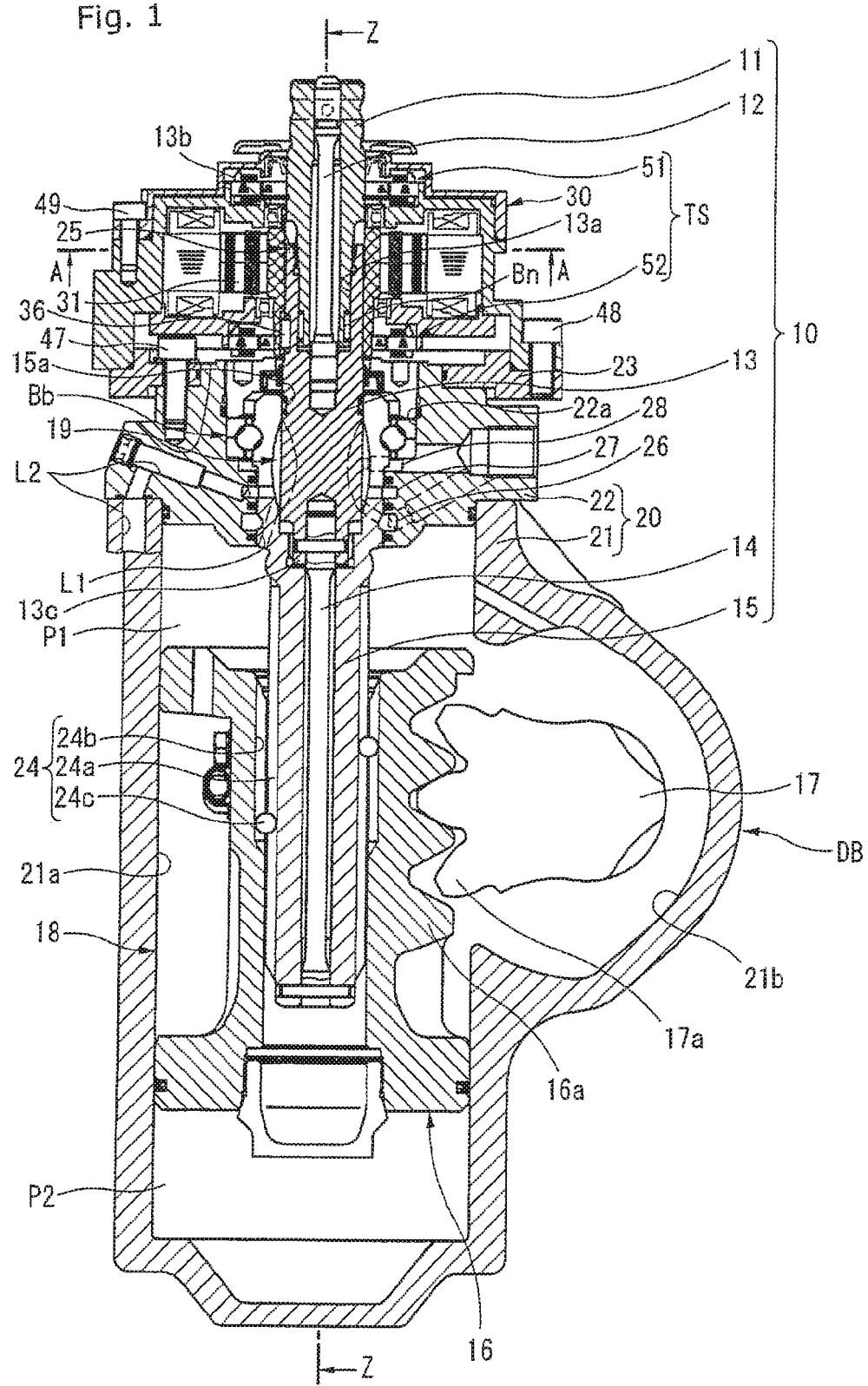
FIG. 1 is a vertically sectional view of a power steering device of the present invention.
Figure 2:
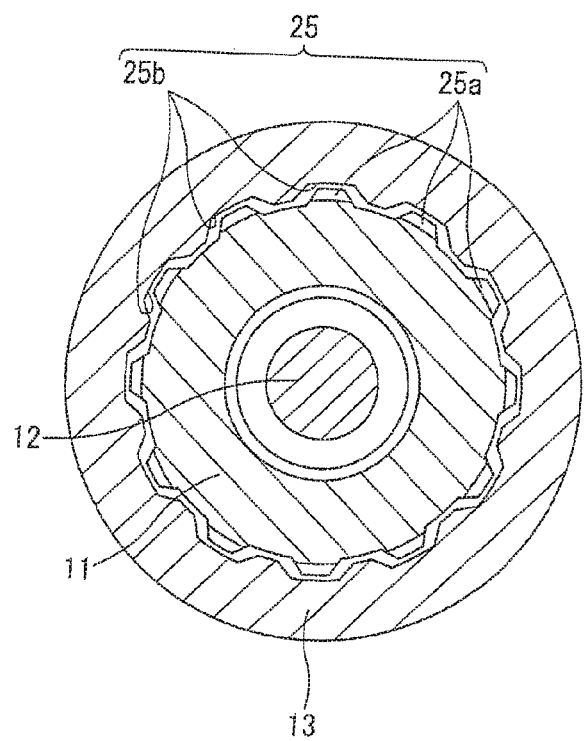
FIG. 2 is a sectional view taken along the line A-A of FIG. 1.

FIG. 1 is a vertically sectional view of the above-mentioned integral type power steering device. FIG. 2 is a sectional view taken along the line A-A of FIG. 1. In the following, in corresponding drawings, a side linked to a steering wheel (not shown) with respect to Z-direction of a rotation axis of a steering shaft 10 will be referred to as "one end", and a side linked to a piston 16 will be referred to as "the other end".

The power steering device comprises a power steering device body (which will be simply referred to as "device body" hereinafter) DB that includes a steering shaft 10 that has one end exposed to outside of a housing 20 and linked to a steering wheel (not shown) and the other end received in the housing 20, a sector shaft 17 that has one end inked to steered road wheels (not shown) and serves as a transmission mechanism that carries out a steering in response to an axial movement of an after-mentioned piston 16 provided at an outer periphery of the other end of the steering shaft 10, and a power cylinder 18 that produces an assist torque for assisting a steering torque and includes a pair of pressure chambers, viz., first and second pressure chambers P1 and P2 that are defined by the piston 16 which is generally cylindrical in shape and slidably received in the housing 20, and a hollow motor 30 that includes an after-mentioned rotor 31 fitted to an outer periphery of the steering shaft 10 and feeds the steering shaft 10 with a rotation torque to achieve a steering assist and assist an automatic driving of a vehicle.

The steering shaft 10 comprises an input shaft 11 that has one end connected to the steering wheel to receive a steering torque of a driver, an intermediate shaft 13 that has one end relatively rotatably connected to the input shaft 11 through a first torsion bar 12 and receives a drive torque of the hollow motor 30 connected to an outer periphery thereof, and an output shaft 15 that has one end relatively rotatably connected to the intermediate shaft 13 through a second torsion bar 14 and outputs the steering torque inputted from the intermediate shaft 13 to the piston 16 through a ball-screw mechanism 24 that is a conversion mechanism. The ball-screw mechanism 24 comprises the above-mentioned output shaft 15 that is a screw shaft and has on an outer periphery of the other end thereof a ball groove 24a, the above-mentioned piston 16 that is disposed about an outer periphery of the output shaft 15 to serve as a nut and has at an inner cylindrical wall thereof a ball groove 24b that corresponds to the ball groove 24a, and a plurality of balls 24c that are disposed between the piston 16 and the output shaft 15.

The other end of the input shaft 11 is inserted into a recessed opening 13a formed in one end of the intermediate shaft 13 and rotatably supported by a needle bearing Bn set between the overlapped portions. While, the intermediate shaft 13 is inserted and received in a recessed opening 15a formed in a diametrically enlarged one end of the output shaft 15, and between the shafts 13 and 15 at the overlapped portions, there is constructed a known rotary valve 19 as a control valve, that selectively feeds an operating fluid to the first and second pressure chambers P1 and P2 in accordance with the relative rotation between the shafts 13 and 15, the operating fluid being supplied from a liquid pressure source (not shown).

Furthermore, between the input shaft 11 and the intermediate shaft 13, there is provided a stopper mechanism 25 that restricts the maximum value of a rotation angle of the input shaft 11 relative to the intermediate shaft 13 to a predetermined angle θx irrespective of a torsion amount of the first torsion bar 12. This stopper mechanism 25 comprises a plurality of projected engaging portions 25a that are formed on an outer cylindrical surface of the input shaft 11 and a plurality of recessed engaging portions 25b that are formed on an inner cylindrical surface of the recessed opening 13a of the intermediate shaft 13 and engageable with the above-mentioned projected engaging portions 25a, and when these two types of engaging portions 25a and 25b make a relative rotation of the predetermined angle θx, these two types of engaging portions are brought into contact to each other, so that the maximum angle of the relative rotation amount of the two types of engaging portions 25a and 25b is restricted (see FIG. 2).

The housing 20 comprises a first housing part 21 that is cylindrical in shape and has one end opened and the other end closed so as to provide with the first and second pressure chambers P1 and P2 and a second housing part 22 that is arranged to close the open end of the first housing part 21 and has the rotary valve 19 installed therein. The first and second housing parts 21 and 22 are secured to each other by a plurality of bolts (not shown) arranged at given circumferential positions.

Within the first housing part 21, there are provided a cylinder constituting part 21a that extends along the Z-direction of the rotation axis of the steering shaft 10 and a shaft receiving part 21b a part of which is exposed to the cylinder constituting part 21a, and due to provision of both the other end of the output shaft 15 and the piston 16 linked to an outer periphery of the other end of the output shaft 15 in the cylinder constituting part 21a, the part 21a forms therein the first pressure chamber P1 at one end side and the second pressure chamber P2 at the other end side that are partitioned by the piston 15, and within the shaft receiving part 21b, there is installed the sector shaft 17 an axial end of which is linked to the piston 16 and the other axial end of which is linked to the steered road wheels (not shown) through a pitman arm (not shown).

On respective outer surfaces of the piston 16 and the sector shaft 17, there are formed tooth portions 16a and 17a that are meshed to each other, and due to the meshing between the tooth portions 16a and 17a, an axial movement of the piston 16 brings about a turning of the sector shaft 17, so that the above-mentioned pitman arm is pulled in the direction of width of an associated vehicle body thereby causing the steered road wheels to change their direction. During this movement, the operating fluid in the first pressure chamber P1 is led to the shaft receiving part 21b, so that lubrication of the tooth portions 16a and 17a is achieved.

In a radially inner part of the second housing part 22, there is formed a shaft inserting through bore 22a through which the above-mentioned coupled shafts 13 and 15 are inserted, the through bore 22a being stepped in shape while reducing its diameter as it extends from one end side toward the other end side along the Z-direction of the rotation axis. At a larger diameter portion of the one end of the through bore, there is provided a bearing Bb that rotatably supports the output shaft 15. While, at a smaller diameter portion of the other end of the through bore, there are provided an inlet port 26 that connects to an fluid pressure source (not shown), a supply/discharge port 27 that feeds or discharges the hydraulic pressure from the inlet port 26 to and from the pressure chambers P1 and P2 and a discharge port 28 that discharges the operating fluid, which has been discharged from the pressure chambers P1 and P2 through the supply/discharge port 27, to a reservoir tank (not shown). The supply/discharge port 27 is connected to the first pressure chamber P1 through a first supply/discharge passage L1 provided at the diametrically enlarged portion of the one end of the output shaft 15, and to the second pressure chamber P2 through a second supply/discharge passage L2 provided in the first housing part 21.

When, with the above-mentioned construction of the power steering device, the steering wheel is steered or turned, the operating fluid supplied from the fluid pressure source is led through the rotary valve 19 to one of the pressure chambers P1 and P2 in accordance with a steering direction, and at the same time, the operating fluid (excess part) by an amount corresponding to the supplied operating fluid is discharged from the other one of the pressure chambers P1 and P2 to the reservoir tank, so that due to the hydraulic pressure, the piston 16 is driven and thus an assist torque produced based on the hydraulic pressure applied to the piston 16 is applied to the sector shaft 17.

Figure 3:
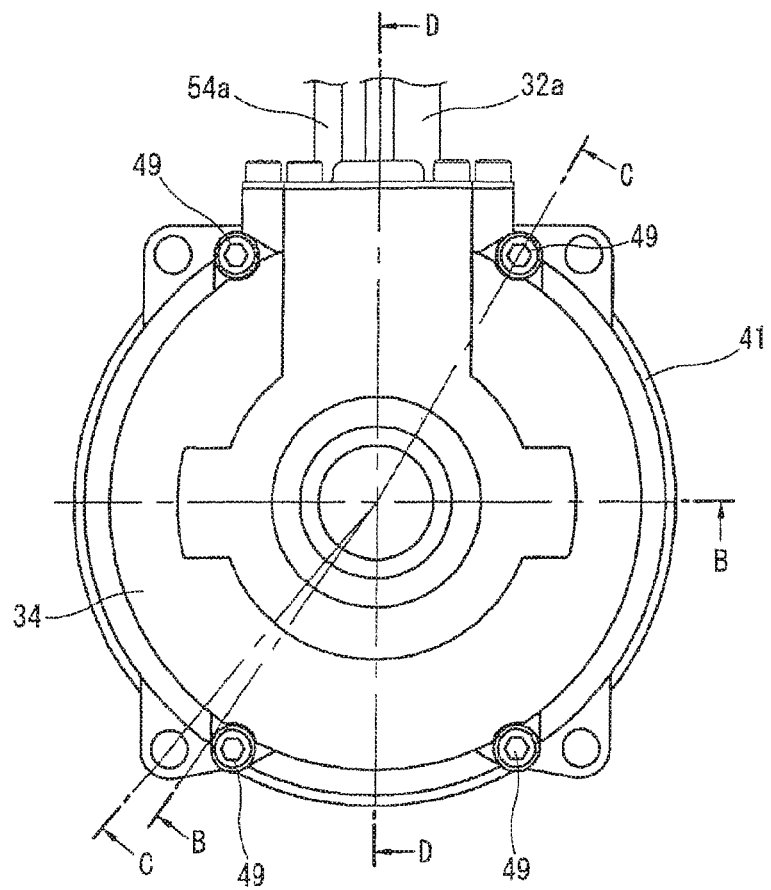
FIG. 3 is a view of a hollow motor of FIG. 1 taken from one end side of the motor.
Figure 4:
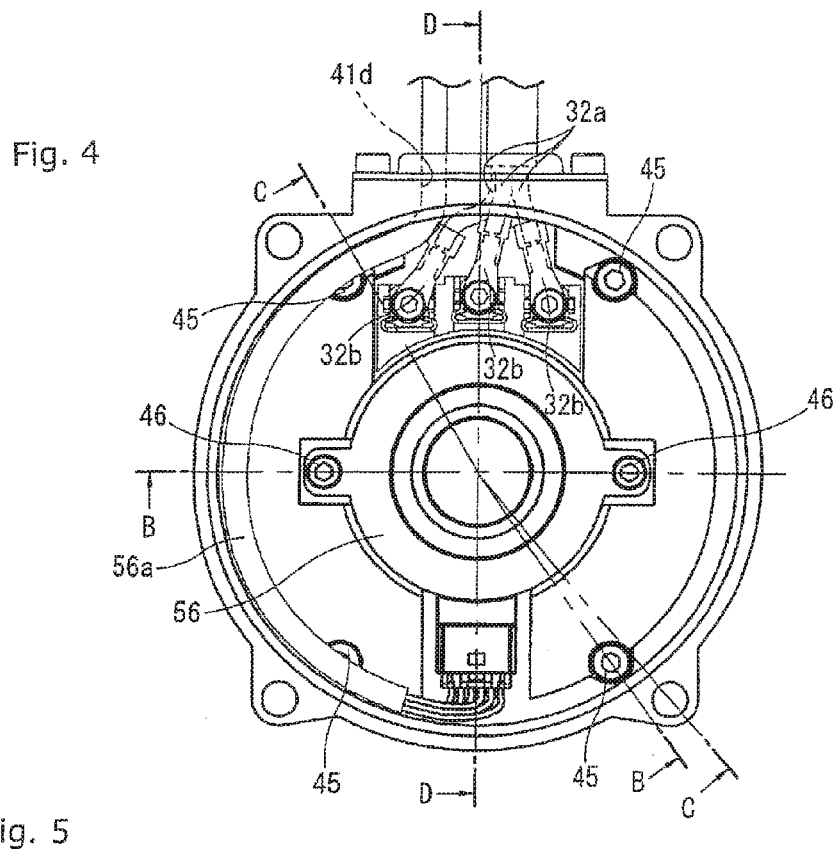
FIG. 4 is a view of the hollow motor of FIG. 1 taken from the other end side of the motor.
Figure 5:
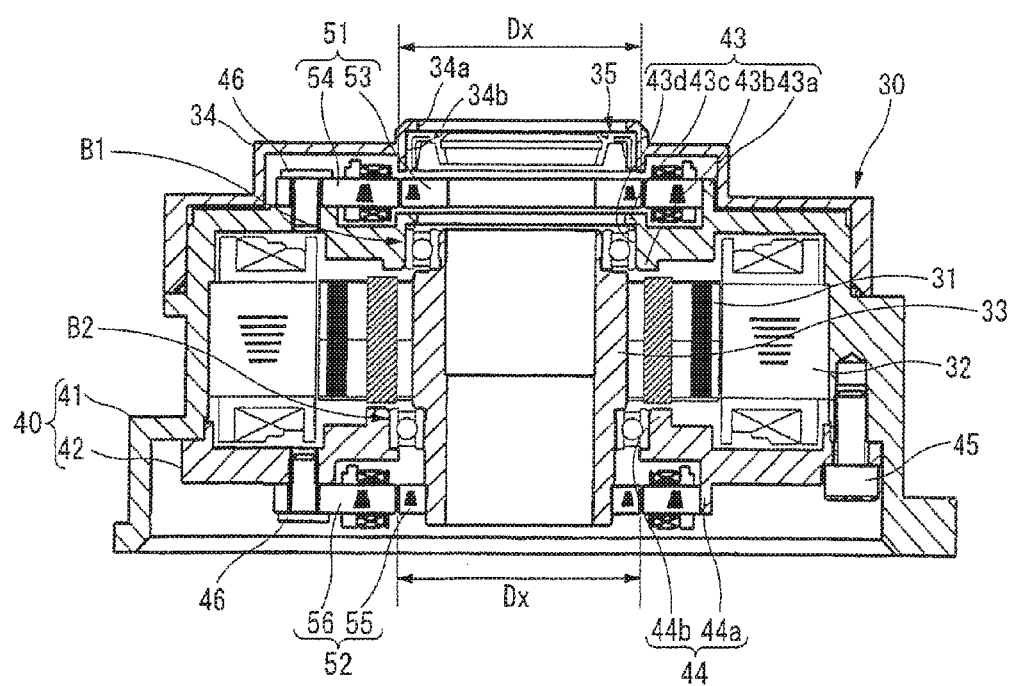
FIG. 5 is a sectional view taken along the line B-B of FIG. 3.
Figure 6:
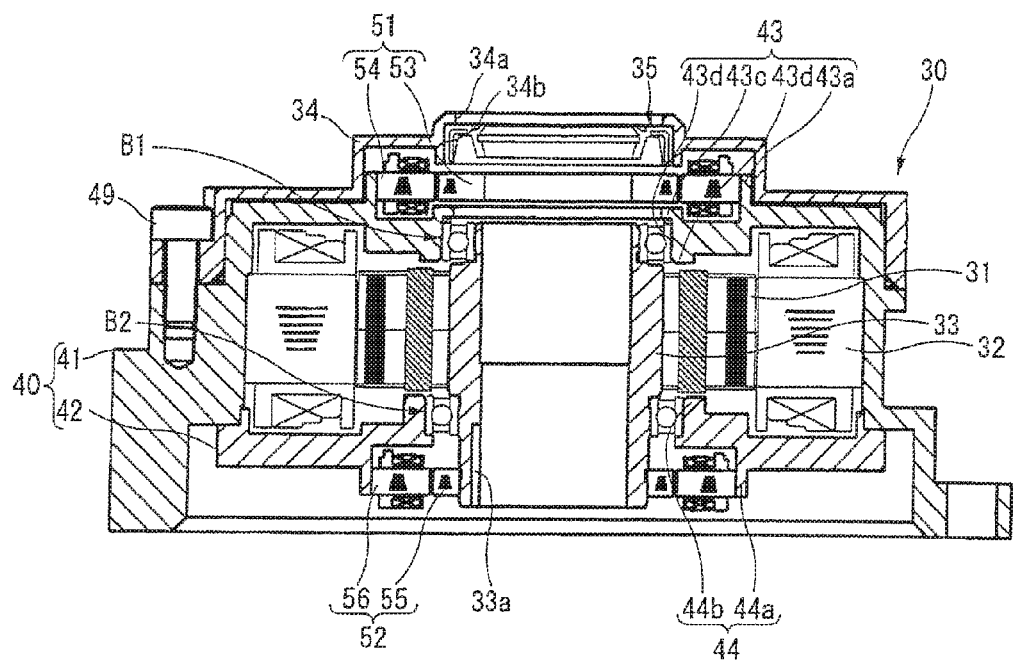
FIG. 6 is a sectional view taken along the line C-C of FIG. 3.
Figure 7:
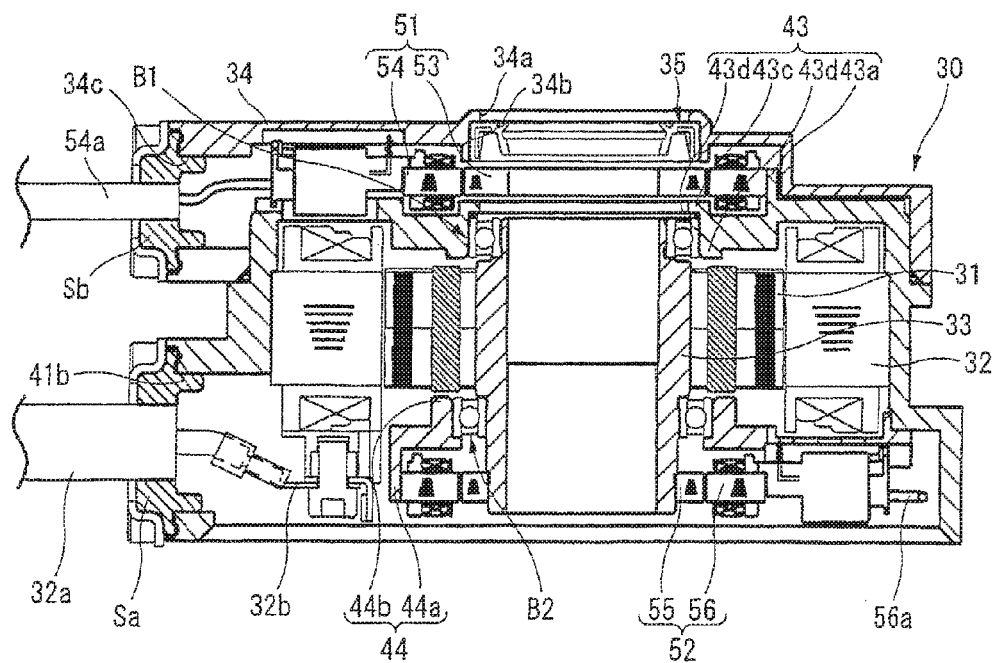
FIG. 7 is a sectional view taken along the line D-D of FIG. 3.

FIG. 3 is a view of the hollow motor taken from one end side of the motor and FIG. 4 is a view of the hollow motor taken from the other end side of the motor. Furthermore, FIG. 5 is a sectional view taken along the line B-B of FIG. 3, FIG. 6 is a sectional view taken along the line C-C of FIG. 3 and FIG. 7 is a sectional view taken along the line D-D of FIG. 3. In the following explanation, one side of the Z-direction of the rotation axis of a connecting member 33 where a first resolver 51 is placed in FIGS. 5 to 7 will be referred to one end side, the other side where a second resolver 52 will be referred to the other end side.

The hollow motor 30 is of a three-phase AC type brushless motor and comprises a motor rotor 31 that is integrally mounted through a cylindrical connecting member 33 to an outer cylindrical portion of an end part of the intermediate shaft 13 that is exposed to the outside of the housing 20, a motor element that is constructed by a motor stator 32 arranged around the motor rotor 31 keeping a given space therebetween, a generally cylindrical motor housing 40 that has one end portion housing therein the motor element and the other end portion connected through an adapter member 23 to the housing 20 (second housing part 22), first and second bearings B1 and B2 that are housed in the motor housing 40 and rotatably support one end and the other end portions of the connecting member 33 respectively, a first resolver 51 that is a first rotation angle sensor and arranged at one end side of the motor housing 40 (which is one end side of the motor element) to detect a rotation angle of the input shaft 11, a second resolver 52 that is arranged to the other end side of the motor housing 40 (which is the other end side of the motor element) to detect a rotation angle of the intermediate shaft 13, a cover member 34 that protects installed parts such as the first resolver 51 and the like by closing an opening of the one end portion of the motor housing 40, and a seal member 35 that fluidtightly seals a space defined between the cover member 34 and the input shaft 11.

To the other end portion of the motor stator 32, there is connected a motor wiring 32a through which an excitation current from a control device (ECU, not shown) flows, and the motor wiring 32a is arranged to take the same level position with respect to the axial direction. Actually, the motor wiring 32a is extracted from a motor wiring extracting opening 41b that is formed in a cylindrical wall of the first motor housing 41 at a position facing the connecting portion to the motor stator 32, and the extracted wire 32a is connected to the above-mentioned control device. Since, in this case, a space between the motor wiring extracting opening 41b and the motor wiring 32a is fluidtightly sealed by a given seal plug Sa, and thus, dust, moisture and the like are prevented from entering into the hollow motor 30.

Due to a known key-connection made between a key 36 projected from the input shaft 11 and a key groove 33a formed at a cylindrical wall of the connecting member 33, the connecting member 33 is connected to the intermediate shaft 13 in such a manner as to establish an integral rotation with the intermediate shaft 13 while permitting a relative axial movement between the connecting member 33 and the intermediate shaft 13 (FIGS. 1 and 9), and thus, even if linear expansion coefficients of these intermediate shaft 13 and connecting member 33 are different, the relative displacement between them 13 and 33 is permitted. Furthermore, due to the connection of the motor rotor 31 to the intermediate shaft 13 through the connecting member 33, the device body DB and the hollow motor 30 can be manufactured and adjusted independently and parallelly.

The motor housing 40 has a split body made of a given metal material such as aluminum alloy or the like, and the motor housing 40 has in an inner cylindrical wall of one end part thereof both the first bearing B1 and the first resolver 51 and has at the other end part thereof the cylindrical first motor housing 41 that houses therein the motor element and a second motor housing 42 that closes an opening of the other end portion of the first motor housing 41 and houses therein the second bearing B2 and the second resolver 52. The first and second motor housings 41 and 42 are connected to each other by means of a plurality of bolts 45 arranged at given circumferential positions (see FIGS. 4 and 5).

The first motor housing 41 is generally cylindrical in shape and has at one end portion thereof a first part holding portion 43 that houses the first bearing B1 and the first resolver 51 and at the other end portion thereof a diametrically larger motor element holding portion 41a that houses the motor element, the motor element holding portion 41a being stepped in shape while increasing its diameter. The first part holding portion 43 has at one end side thereof a first resolver holding portion 43a as a first sensor stator holding portion that has at its one end an opening to hold a first resolver stator 54 of the first resolver 51 and the first part holding portion 43 has at the other end side thereof a first bearing holding portion 43b that has an opening to hold the first bearing B1. To one end of the first bearing holding portion 43b, there is provided a first bearing restricting portion 43c that restricts the movement of the first bearing B1 toward the one end, and the first bearing restricting portion 43c and a holding recess 43d of the first resolver holding portion 43a are overlapped in an axial direction.

The second motor housing 42 has a nearly disc shape and has at its center portion a projected second part holding portion 44 that houses therein both the second bearing B2 and the second resolver 52. The second part holding portion 44 has at its one end side a second bearing holding portion 44b that has an opening to hold the second bearing B2 and the portion 44 has at its other end side a second resolver holding portion 44a as a second sensor stator holding portion that has an opening to hold a second resolver stator 56 of the second resolver 52.

The first resolver 51 is set to have a given outer diameter Dx and comprises a first resolver rotor 53 that is fitted to an outer cylindrical surface of the input shaft 11 to make an integral rotation with the input shaft and the first resolver stator 54 that is arranged around the first resolver rotor 53 while being fixed to the first resolver holding portion 43a, so that the first resolver stator 54 detects a rotation position of the first resolver rotor 53. To the first resolver stator 54, there is connected a first sensor output wiring 54a that feeds the detecting results to the above-mentioned control device. After the first sensor output wiring 54a is extracted from a first output wiring extracting opening 34c formed in a surrounding wall of the cover member 34, the wire 54a is connected to the above-mentioned control device. Since, in this case, a space between the first output wiring extracting opening 34c and the first second output wiring 54a is fluidtightly sealed by a given seal plug Sb, and thus, moisture and the like are prevented from entering into the hollow motor 30.

The second resolver 52 is set to have the same outer diameter Dx as that of the first resolver rotor 53 and comprises a second resolver rotor 55 that is fitted to an outer cylindrical surface of the connecting member 33 to make an integral rotation with the connecting member and the second resolver stator 56 that is arranged around the second resolver rotor 55 while being fixed to the second resolver holding portion 44a, so that the second resolver stator 56 detects a rotation position of the second resolver rotor 55. In this second resolver 52, by detecting a rotation angle of the connecting member 33 that makes an integral rotation with the intermediate shaft 13, a rotation angle of the motor rotor 31 can be detected.

In the second resolver stator 56, a second sensor output wiring 56a that outputs or feeds the above-mentioned detecting results to the control device is connected to the motor wiring 32a in such a manner that the two wirings 56a and 32a take the same level positions with respect to the axial direction while being spaced away from each other in a circumferential direction, and the second sensor output wiring 56a is extracted from a second output wiring extracting opening 41d that is formed in the cylindrical wall of the first motor housing 41 near the motor wiring extracting opening 41b, and the wire 56a is connected to the control device that is placed at the outside. As is mentioned hereinabove, the second sensor output wiring 56a is withdrawn from a position that is remote from the motor wiring 32a in the circumferential direction and the wire 56a is arranged to extend along the surrounding wall of the motor housing 40 and extracted to the outside from a position that is near the motor wiring 32a (see FIGS. 4 and 7).

By the paired first and second resolvers 51 and 52, there is constructed a torque sensor TS that is used for calculating a steering torque fed from a driver, the steering torque from the driver being produced in the first torsion bar 12 based on a difference between a rotation angle of the input shaft 11 that is detected by the first resolver 51 and a rotation angle of the intermediate shaft 13 synchronously rotated with the connecting member 33 that is detected by the second resolver 52. In the above-mentioned control device, abnormality of the power steering device is detected by comparing the output signals of the first and second resolvers 51 and 52.

In the first and second resolvers 51 and 52, the first and second resolver stators 54 and 56 output sine-wave and cosine-wave signals that satisfy [number of amplitude (or peaks) per one rotation of the first resolver rotor 53: A x<360°/(given angle θx×2)], and the rotation angle of the input shaft 11 and that of the hollow motor 30 are calculated based on the output signals in the control device.

The cover member 34 is shaped like a lidded cylinder and has at a middle portion thereof a shaft passing hole 34a through which the input shaft 11 passes. The shaft passing hole 34a of the cover member 34 is formed at a peripheral edge thereof is formed with a generally cylindrical seal receiving portion 34b whose other end portion is opened. Due to the seal member 35 held in the seal receiving portion 34b for hermetically sealing a space between the input shaft 11 and the cover member 34, outside moisture and dust are suppressed from entering into the cover member through the shaft passing hole 34a. It is to be noted that the seal member 35 is so arranged that the seal member 35 and the first resolver rotor 51a are overlapped in an axial direction.

In the power steering device having the above-mentioned construction, in addition to a manual steering based on the above-mentioned steering torque produced by a driver, an automatic steering used for parking, lane keeping and the like is possible by controlling the hollow motor 30 based on information fed from various sensors, ladder, camera and predetermined drive information receiving means (not shown).

Figure 8:
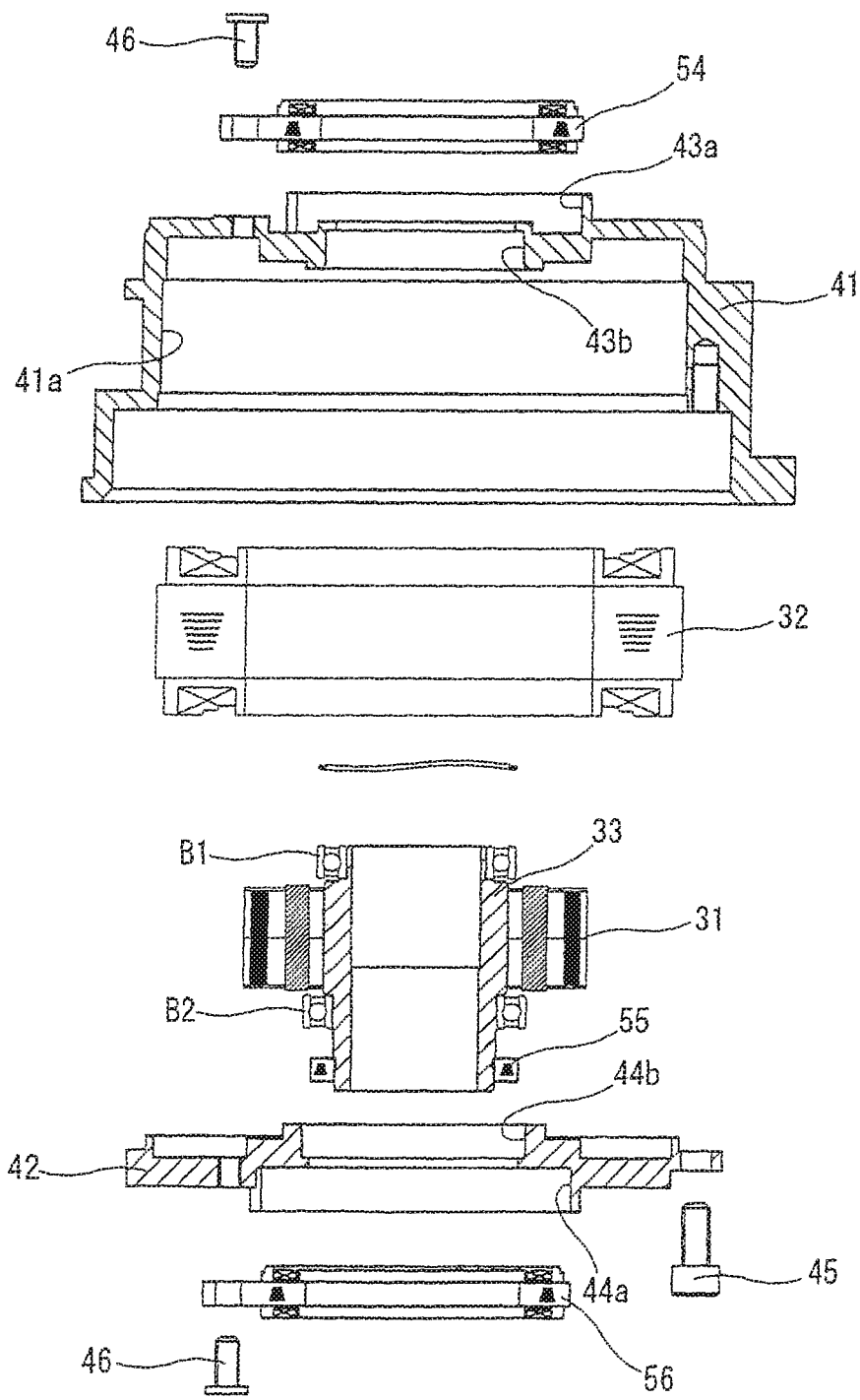
FIG. 8 is an exploded sectional view of the hollow motor.
Figure 9:
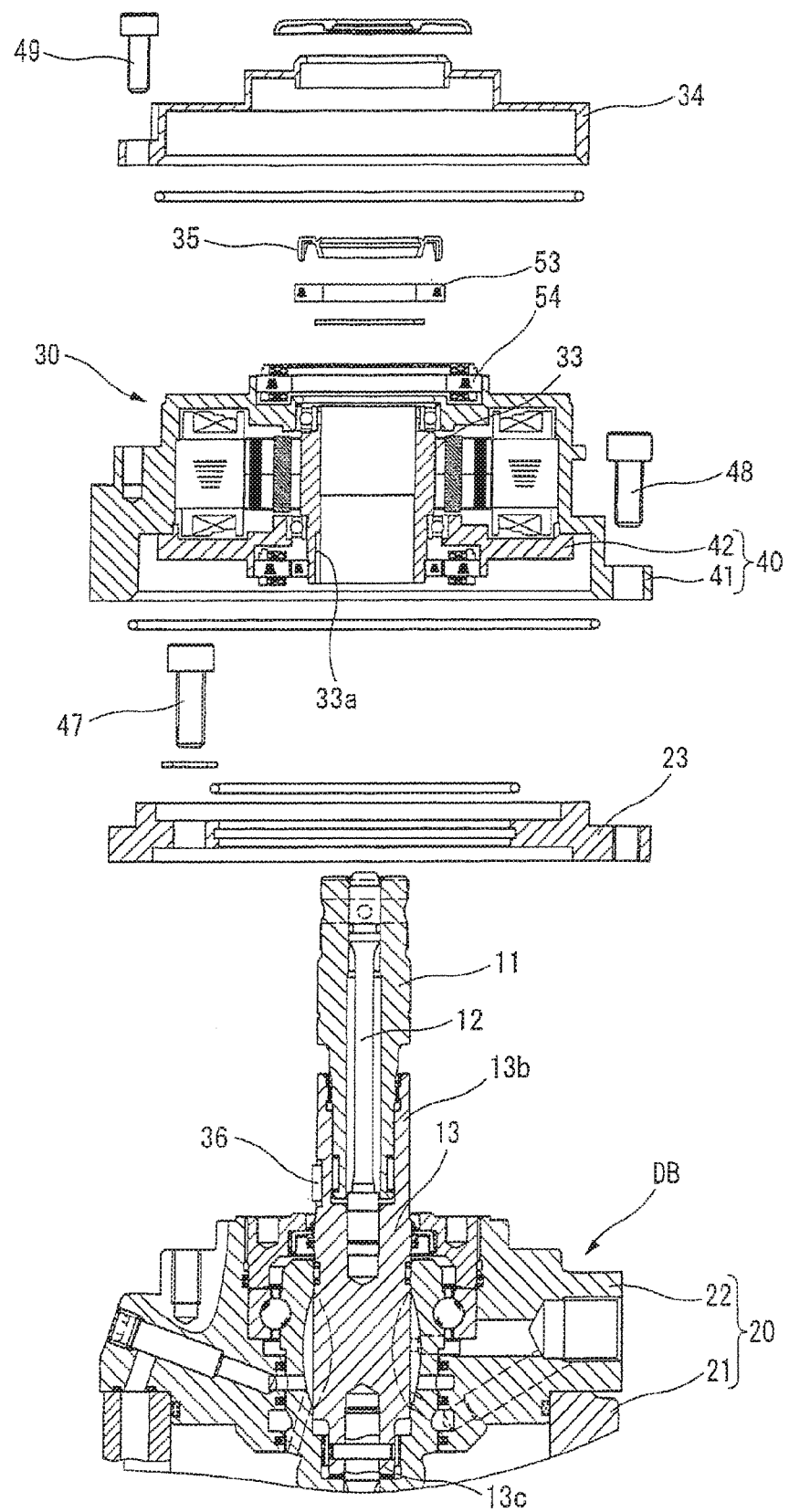
FIG. 9 is an exploded sectional view of the hollow motor and a device body.

FIG. 8 is an exploded sectional view of the hollow motor 30 and FIG. 9 is an exploded sectional view of the hollow motor 30 and the device body DB. In the following, sub-assembling of the hollow motor 30 and assembling of the hollow motor 30 and the device body DB will be described with the aid of such drawings.

First, in parallel with assembling of the device body, assembling of the hollow motor 30 is carried out. That is, as will be understood from FIG. 8, the motor stator 32 is fitted and fixed to an inner cylindrical surface of the motor element holding portion 41a of the first motor housing 41. At the same time, after the motor rotor 31 is fitted to an outer cylindrical surface of the connecting member 33, the first bearing B1 is fitted and fixed to an outer cylindrical surface of a smaller diameter portion of one end portion of the connecting member 33 and the second bearing B2 and the second resolver rotor 55 are fitted and fixed to an outer cylindrical surface of a smaller diameter portion of the other end portion of the connecting member 33. Then, the motor rotor 31 assembled to the connecting member 33 is inserted from the side of the first bearing B1 into the motor stator 32 assembled to the first motor housing 41, and then, the motor rotor 31 is assembled and fixed to the first motor housing 41 through the first bearing B1.

Then, the first and second resolver stators 54 and 56 are inserted into the resolver holding portions 43a and 44a of the first and second motor housings 41 and 42 and fixed to the holding portions by bolts 46, and then, fitted and fixed to the second bearing B2 through which the second motor housing 42 is assembled to the connecting member 33, and then, both the motor housings 41 and 42 are fixed to each other by bolts 45. With these steps, assembling of the hollow motor 30 is completed. After completion of the hollow motor assembling, operation test of the hollow motor 30 is carried out by rotating the hollow motor.

After the operation test, assembling of the hollow motor 30 to the device body DB is carried out. That is, as is seen from FIG. 9, the adapter member 23 is fixed to one end portion of the second housing 22 by means of a plurality of bolts 47, and then, the intermediate shaft 13 having the key 36 previously held and fixed thereto is passed through an in inner cylindrical side of the hollow motor 30 (connecting member 33) and then the hollow motor 30 is fixed to the adapter member 23 by means of a plurality of bolts 48. Then, fitting of the first resolver rotor 53 is carried out from one end side of the input shaft 11 to which the hollow motor 30 is already assembled, and then, the cover member 34 having the seal member 35 fitted to the seal holding portion 34b is fixed to one end portion of the motor housing 40 by means of a plurality of bolts 49, and by covering the first resolver holding portion 43a by the cover member 34, assembling of the power steering device is completed.

In the following, characteristic effects of the power steering device of the embodiment will be listed.

(1) In the above-mentioned power steering device, the first torsion bar 12 that influences a detection accuracy of a steering torque and the second torsion bar 14 that influences an open/close accuracy of the rotary valve 19 are separately provided, and thus, the stiffness (spring constant) of the torsion bars 12 and 14 can be suitably or appropriately set to the torque sensor TS and the rotary valve 19 as compared with a conventional one in which such torsion bars are integrally constructed, and thus, a high accuracy detection by the torque sensor TS and a high accuracy open/close operation by the rotary valve 19 can be achieved at the same time.

(2) In the above-mentioned power steering device, both the first resolver 51 and the first sensor output wiring 54a and both the second resolver 52 and the second sensor output wiring 56a are collected at the side of the hollow motor 30 that is one end portion of the rotary valve 19, and thus, handling of the output wirings 54a and 56a and layout performance are improved.

(3) In the above-mentioned power steering device, there is employed a construction that drives and controls the hollow motor 30 based on a control signal that is produced by the control device based on both a rotation angle position of the input shaft 11 and a rotation angle position of the motor rotor 31 that are detected by the torque sensor TS (the first resolver 51 and the second resolver 52), and thus, the steering torque and the rotation position of the motor rotor 31 can be detected by only one torque sensor TS, which brings about simplification of the device.

(4) In the above-mentioned power steering device, there is employed a construction in which a control signal used for driving and controlling the hollow motor 30 is calculated based on an output signal of the second resolver 52 and the output signal of the second resolver 52 is not affected by the twisting of the first torsion bar 12, and thus, detection of the rotation position of the motor rotor 31 can be achieved with a high accuracy.

(5) In the above-mentioned power steering device, by comparing the output signal from the first resolver 51 and the output signal from the second resolver 52 in the control device, abnormality is detected which is a merit.

(6) If the first and second resolvers 51 and 52 are arranged at the other end side with respect to the motor element, the construction of the device would be more complicated because fluid passages and other constructions gather near the rotary valve 19, and if the resolvers 51 and 52 are arranged at the one end side with respect to the motor element, the radial dimension of an upper end portion of the device would be increased because the output wirings 54a and 56a of the resolvers gather at the one end side of the motor element. However, in the present embodiment, the first and second resolvers 51 and 52 are evenly arranged at both the one end side and the other end side with respect to the motor element, and thus, well-balanced layout is achieved and enlargement of the upper end portion of the device is suppressed.

(7) In the above-mentioned power steering device, the second resolver 52 and the motor wiring 32a are overlapped in an axial direction of the hollow motor 30, and thus, the axial dimension of the hollow motor 30 can be reduced and thus the axial dimension of the power steering device can be reduced.

(8) In the above-mentioned power steering device, the second sensor output wiring 56a and the motor wiring 32a are overlapped in an axial direction of the hollow motor 30, and thus the axial dimension of the hollow motor 30 can be reduced and thus the axial dimension of the power steering device can be reduced.

(9) In the above-mentioned power steering device, a connecting portion 32b where the motor wiring 32a is connected to the motor stator 32 and the second resolver 52 are arranged to be spaced away from each other in a circumferential direction, and thus, as is mentioned hereinabove, the connecting portion 32b and second resolver 52 can be overlapped in an axial direction, and thus, the axial dimension of the device can be reduced.

On the other hand, due to the arrangement in which the motor wiring 32a and the second sensor output wiring 56a are extracted from respective positions that are near to each other in a circumferential direction, handling of both the wirings 32a and 56a is easy and layout performance of the device to the vehicle is improved.

(10) In the above-mentioned power steering device, a first connecting portion 13b where the intermediate shaft 13 is connected to the first torsion bar 12 and a second connecting portion 13c where the intermediate shaft 13 is connected to the second torsion bar 14 are integrally formed. This means that a portion that serves as the rotary valve 19 and a portion that receives a motor torque are constructed by the same member, and thus, simplification of the device and reduction of the manufacturing cost are achieved.

(11) In the above-mentioned power steering device, the second resolver 52 is arranged to the connecting member 33, not to the intermediate shaft 13, and thus, the connecting member 33 and the second resolver rotor 55 connected to the connecting member 33 can be assembled to the steering shaft 10 including the intermediate shaft 13 in a state where the parts 33 and 55 are assembled to the hollow motor 30. As a result, it is possible to produce and adjust the hollow motor 30 in a process different from that for producing the above-mentioned power steering device, and thus, productivity and quality control of the device can be improved.

(12) In the above-mentioned power steering device, for connecting the hollow motor 30 and the intermediate shaft 13 through the connecting member 33, the connecting member 33 and the intermediate shaft 13 are arranged to make a relative axial movement therebetween. Thus, even in case where the intermediate shaft 13 and the connecting member 33 are different in the linear expansion coefficient, a relative displacement between the parts 13 and 33 can be permitted, which is a merit.

(13) In the above-mentioned power steering device, for axially supporting the input shaft 11, the bearing Bn for rotatably supporting the input shaft 11 is installed in the recessed opening 13a of the intermediate shaft 13, and thus, there is no need of providing the input shaft 11 with an extra-portion that is to be held by the bearing, and thus, the axial dimension of the device can be reduced.

(14) In the above-mentioned power steering device, in the hollow motor 30, the first part holding portion 43 of the first motor housing 41 is arranged to hold both the first bearing B1 and the first resolver stator 54, and thus, simplification and downsizing of the device are obtained.

(15) In the above-mentioned power steering device, for extracting the first sensor output wiring 54a from the motor housing 40, the cover member 34 that covers the first resolver 51 is formed with the first output wiring extracting opening 34c, and thus, reduction in length of the first sensor output wiring 54a is achieved.

(16) In the above-mentioned power steering device, in the hollow motor 30, the holding recess 43d of the first resolver holding portion 43a and the first bearing restricting portion 43c are overlapped to each other in the axial direction, and thus, the axial dimension of the hollow motor 30 can be reduced and thus the axial dimension of the device can be reduced.

(17) In the above-mentioned power steering device, the arrangement of the seal member 35 is so made that the seal member 35 and the first resolver 51 are overlapped to each other in the axial direction, and thus, axial dimension of the hollow motor 30 can be reduced and thus the axial dimension of the device can be reduced.

(18) In the above-mentioned power steering device, in the hollow motor 30, the second part holding portion 44 of the second motor housing 42 is so constructed as to hold both the second resolver stator 56 and the second bearing B2, and thus, simplification in construction of the device and downsizing of the device can be obtained.

(19) In the above-mentioned power steering device, by causing the first and second resolver rotors 53 and 55 to have at least the same outer diameter (Dx), same members can be used as the first and second resolver stators 54 and 56, and thus, productivity of the device is increased and reduction in cost is achieved.

(20) In the above-mentioned power steering device, the sine-wave signal and the cosine-wave signal are arranged to satisfy [number of amplitude (or peaks) per one rotation of the first resolver rotor 53: A x<360°/(given angle θx×2)], and thus, a relative angle between the input shaft 11 and the intermediate shaft 13, which is calculated in accordance with a twisting amount of the first torsion bar 12, is uniquely determined, and thus, incorrect recognition of the relative angle can be suppressed.

(21) Like in the embodiment, by applying the construction of the auto-steerable power steering device to the integral type power steering device that is employed in large-sized vehicles such as truck and bus, safety of such large-sized vehicles, which have exhibited a relatively large risk, can be greatly increased, which is a big merit.

The present invention is not limited to the above-mentioned exemplified embodiment. That is, the power steering device of the invention is applicable, in addition to the above-mentioned integral type power steering device, to other type power steering devices, such as a rack-and-pinion type power steering device for a common automobile, if the other type power steering devices have the invention defining elements such as the power cylinder 18, the rotary valve 19 and the like.

In the following, technical ideas other than those that are described in scope of claims of the invention and grasped from the above-mentioned embodiment will be described.

(a) A power steering device as described in Claim 4, which is further characterized in that an output signal of the first rotation angle sensor is compared with an output signal of the second rotation angle sensor in the control device for detecting abnormality of the power steering device.

As is mentioned hereinabove, by comparing the output signals from the rotation angle sensors, abnormality of the power steering device is detected.

(b) A power steering device as described in Claim 5, which is further characterized in that the second rotation angle sensor and the motor wiring are overlapped in the axial direction.

By employing such coaxial arrangement, the axial dimension of the device can be reduced.

(c) A power steering device as described in the (b), which is further characterized in that the second sensor output wiring and the motor wiring are overlapped in the axial direction.

Due to such coaxial arrangement, the axial dimension of the device can be reduced.

(d) A power steering device as described in the (c), which is further characterized in that:

a connecting portion between the motor stator and the motor wiring and the second rotation angle sensor are installed in the motor housing;

the motor housing is formed with both a motor wiring extracting opening through which the motor wiring is extracted to the outside and a second sensor output wiring extracting opening through which the second sensor output wiring is extracted to the outside;

the connecting portion between the motor stator and the motor wiring and the second rotation angle sensor are spaced apart from each other in a circumferential direction of the steering shaft; and the second sensor output wiring extracting opening is positioned nearer to the motor wiring extracting opening than the second rotation angle sensor in the circumferential direction.

Like the above, by placing the connecting portion between the motor stator and the motor wiring and the second rotation angle sensor at positions that are spaced apart from each other in the circumferential direction, these parts can be overlapped in the axial direction, and thus, the axial dimension of the device can be reduced.

Furthermore, since the construction is so made that the motor wiring and the second sensor output wiring are extracted from two positions that are mutually close to each other in the circumferential direction, handling of the wirings can be easily made and thus layout performance of the device in the vehicle is improved.

(e) A power steering device as described in Claim 2, which is further characterized in that the intermediate shaft is constructed of an integrally formed member that has a first connecting portion connected to the first torsion bar and a second connecting portion connected to the second torsion bar.

By employing such construction, a portion that functions as the control valve and another portion that receives a motor torque can be integrally provided by the same member, and thus, simplification of the device is achieved.

(f) A power steering device as described in (e), which is further characterized in that:

a connecting member is further provided, the connecting member being arranged between the intermediate shaft and the motor rotor to connect the motor rotor to the intermediate shaft; and the second rotation angle sensor comprises:

a second sensor rotor installed on an outer cylindrical surface side of the connecting member; and a second sensor stator installed to the motor housing at a position outside the second sensor rotor to detect a rotation position of the second sensor rotor.

As is mentioned hereinabove, since the second sensor rotor is installed to the connecting member side not to the intermediate shaft side, a unit in which the connecting member and the second sensor rotor installed to the connecting member are assembled in the hollow motor side can be assembled to the steering shaft that includes the intermediate shaft.

As a result, the hollow motor can be produced and adjusted in a process different from that for the steering device, and thus productivity and quality control are improved.

(g) A power steering device as described in (f), which is further characterized in that the connecting member is relatively movably connected to the intermediate shaft in the axial direction.

By employing such construction, the relative displacement between the intermediate shaft and the connecting member can be allowed even when these two members have different linear expansion coefficients.

(h) A power steering device as described in (e), which is further characterized in that:

the intermediate shaft is formed with a recessed opening that faces one axial direction; and the input shaft is connected to the intermediate shaft through the first torsion bar keeping a condition in which an end of the input shaft that extends in another axial direction is inserted into the recessed opening, and the input shaft is rotatably held by a bearing that is installed in the recessed opening between the input shaft and the intermediate shaft.

As is mentioned hereinabove, by installing the bearing in the recessed opening for supporting the input shaft, there is no need of providing an extra-portion by which the bearing is held, and thus, an axial dimension of the device can be reduced.

(i) A power steering device as described in Claim 2, which is further characterized in that:

the first rotation angle sensor comprises a first sensor rotor that is installed to an outer surface side of the input shaft and a first sensor stator that is arranged at an outer surface side of the first sensor rotor to detect a rotation position of the first sensor rotor;

the motor housing includes a cylindrical portion that is provided around the motor stator and a first part holding portion that extends radially inward at the one axial position of the cylindrical portion; and the first part holding portion includes a first bearing holding portion for holding a bearing used for supporting the steering shaft and a first sensor stator holding portion for holding the first sensor stator.

As is mentioned hereinabove, by causing the first part holding portion to hold the first bearing and the first sensor stator, simplification and downsizing of the device are achieved.

(j) A power steering device as described in (i), which is further characterized in that:

the one axial end side of the motor housing is provided with a cover member that is shaped to cover the first rotation angle sensor; and the cover member is formed with a first sensor output wiring extracting opening through which the first sensor output wiring is extracted to the outside.

As is mentioned hereinabove, by providing the cover member that covers the first rotation angle sensor with the first sensor output wiring extracting opening, the first sensor output wiring can be reduced.

(k) A power steering device as described in (i), which is further characterized in that:

the first bearing holding portion is formed at the one axial end side of the first bearing with a first bearing restricting portion by which an axial position of the bearing is restricted;

the first part holding portion is provided at the one axial end side with a first sensor stator holding recess that holds therein the first sensor stator; and the first sensor stator holding recess is arranged to be overlapped with the first bearing restricting portion in the axial direction.

As is mentioned hereinabove, by overlapping the first bearing restricting portion and the first sensor stator holding portion in the axial direction, the axial dimension of the device can be reduced.

(l) A power steering device as described in (i), which is further characterized in that:

a cover member provided on the axial one end side of the motor housing and constructed to cover the first rotation angle sensor and a seal member provided between the cover member and the input shaft and arranged to hermetically seal a connection therebetween are further provided; and the seal member is overlapped with the first rotation angle sensor in the axial direction.

As is mentioned hereinabove, by overlapping the seal member and the first rotation angle sensor in the axial direction, the axial dimension of the device can be reduced.

(m) A power steering device as described in Claim 2, which is further characterized in that:

the second rotation angle sensor includes a second sensor rotor provided on an outer cylindrical surface of the intermediate shaft and a second sensor stator provided at an outer cylindrical surface side of the second sensor rotor to detect the rotation position of the second sensor rotator;

the motor housing includes a cylindrical portion that is provided at an outer cylindrical surface side of the motor stator and a second part holding portion that is provided at the other axial end of the cylindrical portion to extend radially inward; and the second part holding portion includes a second bearing holding portion that holds a second bearing for holding the steering shaft and a second sensor stator holding portion that holds the second sensor stator.

As is mentioned hereinabove, by holding the second bearing and the second sensor stator by the second part holding portion, simplification and size-reduction of the device are achieved.

(n) A power steering device as described in Claim 2, which is further characterized in that:

the first rotation angle sensor includes a first sensor rotor provided at the outer cylindrical surface side of the input shaft and a first sensor stator provided at an outer cylindrical surface side of the first sensor rotor to detect a rotation position of the first sensor rotor;

the second rotation angle sensor includes a second sensor rotor provided at the outer cylindrical surface side of the intermediate shaft and a second sensor stator provided at the outer cylindrical surface side of the second sensor rotor to detect a rotation position of the second sensor rotor; and the first sensor rotor and the second sensor rotor have outer diameters that are identical and inner diameters that are different.

As is mentioned hereinabove, by causing the first and second sensor rotors to have the same outer diameter, it is possible to use the same type of stators as the first and second sensor stators. Thus, improvement of productivity and cost reduction of the device are achieved.

(o) A power steering device as claimed in Claim 2, which is further characterized in that:

the steering shaft is provided, at a position between the input shaft and the intermediate shaft, with a stopper mechanism by which the maximum value of the relative rotation angle of the input shaft relative to the intermediate shaft is restricted to a predetermined value regardless of the twist amount of the first torsion bar;

the first rotation angle sensor is a resolver that includes a first sensor rotor provided at the outer cylindrical surface side of the input shaft and a first sensor stator provided at the outer cylindrical side of the first sensor rotor to detect a rotation position of the first sensor rotor;

the second rotation angle sensor is a resolver that includes a second sensor rotor provided at the outer cylindrical surface side of the second sensor rotor to detect a rotation position of the second sensor rotor; and the first sensor stator and the second sensor stator output sine-wave and cosine-wave signals that satisfy "number of amplitude per one rotation of the first resolver rotor"<360°/ (given angle θx×2).

By adopting such construction, the relative angle between the input shaft and the intermediate shaft, which is calculated in accordance with a twist amount of the first torsion bar, is uniquely determined and thus erroneous recognition of the relative angle can be suppressed.

DESCRIPTION OF REFERENCE NUMERALS

10 . . . steering shaft
11 . . . input shaft
12 . . . first torsion bar
13 . . . intermediate shaft
14 . . . second torsion bar
15 . . . output shaft
16 . . . piston
17 . . . sector shaft (transmission mechanism)
19 . . . rotary valve (control valve)
24 . . . ball-screw mechanism (motion conversion mechanism)
30 . . . hollow motor
31 . . . motor rotor
32 . . . motor stator
32a . . . motor wiring
40 . . . motor housing
51 . . . first resolver (first rotation angle sensor)
52 . . . second resolver (second rotation angle sensor)
54a . . . first sensor output wiring
56a . . . second sensor output wiring
P1 . . . first pressure chamber
P2 . . . second pressure chamber
TS . . . torque sensor

The invention claimed is:

1. A power steering device, comprising:
a steering shaft including an input shaft rotated together with a steering operation of a steering wheel, an intermediate shaft connected to the input shaft through a first torsion bar, and an output shaft connected to the intermediate shaft through a second torsion bar;
a housing that rotatably supports the output shaft;
a piston slidably received in the housing to part an interior of the housing into first and second pressure chambers;
a control valve installed in the housing to selectively feed an operating fluid into the first or second pressure chamber in accordance with a relative rotation between the intermediate shaft and the output shaft;
a transmission mechanism through which an axial movement of the piston is transmitted to steered road wheels;
a hollow motor including a motor rotor provided on an outer cylindrical surface of the intermediate shaft to make an integral rotation therewith, a motor element including a motor stator arranged about the motor rotor and a motor housing for housing the motor element, the hollow motor controlling the rotation of the input shaft in accordance with an operation condition of an associated motor vehicle;
a torque sensor including a first rotation angle sensor for detecting a rotation angle of the input shaft, a second rotation angle sensor for detecting a rotation angle of the intermediate shaft and first and second output wirings for feeding output signals of the first and second rotation angle sensors to an external control device, the torque sensor outputting to the control device a signal used for calculating a steering torque that is produced in the first torsion bar in accordance with a difference between the rotation angle of the input shaft and that of the intermediate shaft; and
a motor wiring connected to the motor stator and receiving an output signal from the control device, the output signal being calculated based on the steering torque and various information of the vehicle.

2. A power steering device as claimed in claim 1, wherein:
the first rotation angle sensor and the first sensor output wiring are provided on an outer cylindrical surface of the input shaft that is one axial end side of the control valve; and
the second rotation angle sensor and the second sensor output wiring are provided on the outer cylindrical surface of the intermediate shaft that is the one axial end side of the control valve.

3. A power steering device as claimed in claim 2, wherein the hollow motor is driven and controlled by a control signal that is calculated by the control device based on a rotation position of the motor rotor detected by one of the rotation sensors of the torque sensor.

4. A power steering device as claimed in claim 3, wherein the control signal is calculated based on an output signal of the second rotation angle sensor.

5. A power steering device as claimed in claim 4, wherein the output signal from the first rotation angle sensor is used for detecting abnormality by comparison, by the control device, with the output signal from the second rotation angle sensor.

6. A power steering device as claimed in claim 2, wherein:
the first rotation angle sensor is provided at a side that is nearer to the one axial end side than the motor element; and
the second rotation angle sensor is provided at a side that is nearer to another axial end side than the motor element.

7. A power steering device as claimed in claim 6, wherein the second rotation angle sensor and the motor wiring are overlapped with each other in an axial direction.

8. A power steering device as claimed in claim 7, wherein the second sensor output wiring and the motor wiring are overlapped with each other in the axial direction.

9. A power steering device as claimed in claim 8, wherein:
a connecting portion between the motor stator and the motor wiring and the second rotation angle sensor are installed in the motor housing;
the motor housing is formed with a motor wiring extracting opening through which the motor wiring is extracted to the outside and a second sensor output wiring extracting opening through which the second sensor output wiring is extracted to the outside;
the connecting portion between the motor stator and the motor wiring and the second rotation angle sensor are provided at positions that are spaced from each other in a circumferential direction of the steering shaft; and
the second sensor output wiring extracting opening is provided nearer to the motor wiring extracting opening than the second rotation angle sensor in the circumferential direction.

10. A power steering device as claimed in claim 2, wherein the intermediate shaft is constructed of an integrally formed member that has a first connecting portion connected to the first torsion bar and a second connecting portion connected to the second torsion bar.

11. A power steering device as claimed in claim 10, wherein:
    a connecting member provided between the intermediate shaft and the motor rotor for connecting the motor rotor and the intermediate shaft is further provided;
    the second rotation angle sensor includes:
        a second sensor rotor provided on an outer cylindrical surface side of the connecting member; and
        a second sensor stator installed to the motor housing at a position outside the second sensor rotor to detect a rotation position of the second sensor rotor.

12. A power steering device as claimed in claim 11, wherein the connecting member is so assembled as to make a relative displacement with the intermediate shaft in an axial direction.

13. A power steering device as claimed in claim 10, wherein:
    the intermediate shaft is formed with a recessed opening that faces one axial direction; and
    the input shaft is connected to the intermediate shaft through the first torsion bar keeping a condition in which an end of the input shaft that extends in another axial direction is inserted into the recessed opening, and the input shaft is rotatably held by a bearing that is installed in the recessed opening between the input shaft and the intermediate shaft.

14. A power steering device as claimed in claim 2, wherein:
    the first rotation angle sensor comprises a first sensor rotor that is installed to an outer surface side of the input shaft and a first sensor stator that is arranged at an outer surface side of the first sensor rotor to detect a rotation position of the first sensor rotor;
    the motor housing includes a cylindrical portion that is provided around the motor stator and a first part holding portion that extends radially inward at one axial position of the cylindrical portion; and
    the first part holding portion includes a first bearing holding portion for holding a bearing used for supporting the steering shaft and a first sensor stator holding portion for holding the first sensor stator.

15. A power steering device as claimed in claim 14, wherein:
    one axial end side of the motor housing is provided with a cover member that is shaped to cover the first rotation angle sensor; and
    the cover member is formed with a first sensor output wiring extracting opening through which the first sensor output wiring is extracted to the outside.

16. A power steering device as claimed in claim 14, wherein:
    the first bearing holding portion is formed at one axial end side of the first bearing with a first bearing restricting portion by which an axial position of the bearing is restricted;
    the first part holding portion is provided at the one axial end side of the first bearing with a first sensor stator holding recess that holds therein the first sensor stator; and
    the first sensor stator holding recess is arranged to be overlapped with the first bearing restricting portion in an axial direction.

17. A power steering device as claimed in claim 14, wherein:
    a cover member provided on the axial one end side of the motor housing and constructed to cover the first rotation angle sensor and a seal member provided between the cover member and the input shaft and arranged to hermetically seal a connection therebetween are further provided; and
    the seal member is overlapped with the first rotation angle sensor in an axial direction.

18. A power steering device as claimed in claim 2, wherein:
    the second rotation angle sensor includes a second sensor rotor provided on the outer cylindrical surface of the intermediate shaft and a second sensor stator provided at an outer cylindrical surface side of the second sensor rotor to detect the rotation position of the second sensor rotator;
    the motor housing includes a cylindrical portion that is provided at an outer cylindrical surface side of the motor stator and a second part holding portion that is provided at one axial end of the cylindrical portion to extend radially inward; and
    the second part holding portion includes a second bearing holding portion that holds a second bearing for holding the steering shaft and a second sensor stator holding portion that holds the second sensor stator.

19. A power steering device as claimed in claim 2, wherein:
    the first rotation angle sensor includes a first sensor rotor provided at an outer cylindrical surface side of the input shaft and a first sensor stator provided at an outer cylindrical surface side of the first sensor rotor to detect a rotation position of the first sensor rotor;
    the second rotation angle sensor includes a second sensor rotor provided at an outer cylindrical surface side of the intermediate shaft and a second sensor stator provided at an outer cylindrical surface side of the second sensor rotor to detect a rotation position of the second sensor rotor; and
    the first sensor rotor and the second sensor rotor have outer diameters that are identical and inner diameters that are different.

20. A power steering device as claimed in claim 2, wherein:
    the steering shaft is provided, at a position between the input shaft and the intermediate shaft, with a stopper mechanism by which a maximum value of the relative rotation angle of the input shaft relative to the intermediate shaft is restricted to a predetermined value regardless of a twist amount of the first torsion bar;
    the first rotation angle sensor is a resolver that includes a first sensor rotor provided at the outer cylindrical surface side of the input shaft and a first sensor stator provided at the outer cylindrical side of the first sensor rotor to detect a rotation position of the first sensor rotor;
    the second rotation angle sensor is a resolver that includes a second sensor rotor provided at the outer cylindrical surface side of the second sensor rotor to detect a rotation position of the second sensor rotor; and
    the first sensor stator and a second sensor stator output sine-wave and cosine-wave signals that satisfy "number of amplitude per one rotation of the first resolver rotor"<360°/(given angle θx×2).

21. A power steering device as claimed in claim 2, wherein the transmission mechanism is a ball-screw mechanism that comprises a screw shaft provided by the output shaft, a nut disposed about the screw shaft and having at an inner cylindrical surface thereof a spline groove and a plurality of balls provided between the nut and the screw shaft.

* * * * *